United States Patent

[11] 3,533,328

| [72] | Inventor | Peter Wyssbrod |
| | | Sutz Latrigen, Switzerland |
| [21] | Appl. No. | 747,312 |
| [22] | Filed | July 24, 1968 |
| [45] | Patented | Oct. 13, 1970 |
| [73] | Assignee | Hans Wyssbrod AG |
| | | Bern, Switzerland |
| [32] | Priority | Aug. 11, 1967 |
| [33] | | Switzerland |
| [31] | | No. 11,346/67 |

[54] COPYING MACHINE TOOL
6 Claims, 1 Drawing Fig.

[52] U.S. Cl. ..................................... 90/11.5, 90/56, 90/62
[51] Int. Cl. ..................................... B23c 1/16
[50] Field of Search ........................................... 90/11.5, 11.52, 11.54, 11.56, 56, 57, 59.11, 62

[56] References Cited
UNITED STATES PATENTS
| 1,477,178 | 12/1923 | Ducer .................. | 90/56 |
| 2,574,112 | 11/1951 | Kopec ................... | 90/56 |

Primary Examiner—Gerald A. Dost
Attorney—Imirie, Smiley, Snyder and Butrum

ABSTRACT: A copying machine tool in which the copying template performs a double action, viz: besides the control of the copying operation also the control of the indexing operation.

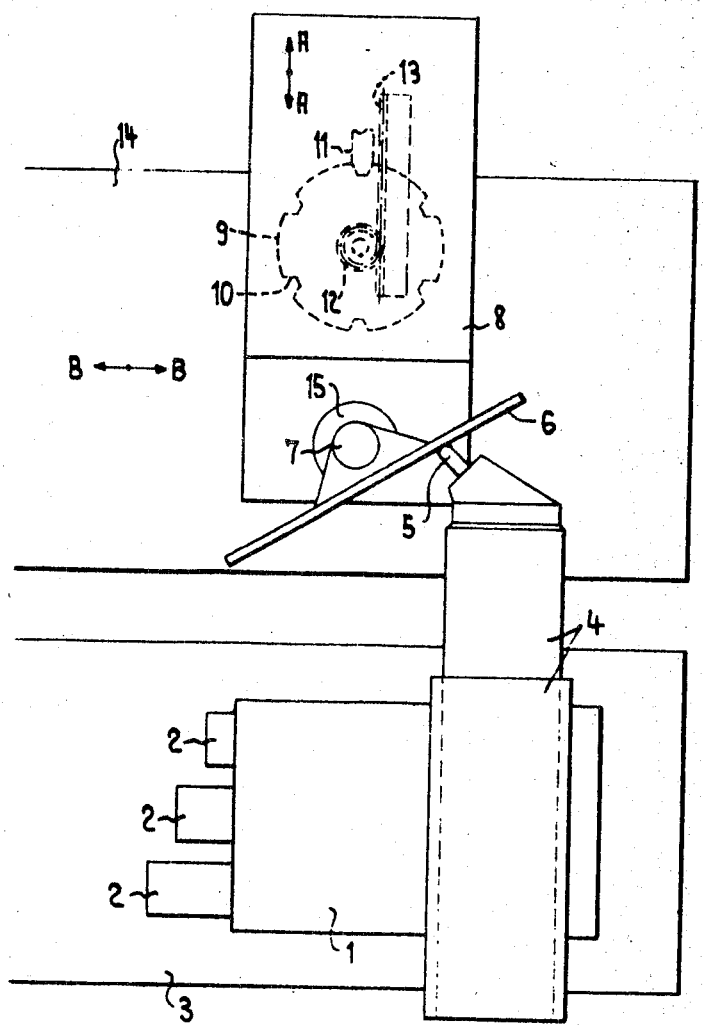

COPYING MACHINE TOOL

The invention relates to a copying machine tool with indexing apparatus, particularly a cutting copying machine tool, in which a copying template controls a copying device for rotating one or more spindles.

Machine tools of this kind serve, for instance, as flute-milling machines for tool making, such as, e.g., milling cutters of various kinds, taps, twist drills, reamers, tools faced with cemented hard carbide, tools for wood and stoneworking etc.

In prior machine tools of this kind, especially in automatic flute-milling or cutting machines the spindle or spindles is or are rotated by means of a differential gearing both for copying work and for indexing, i.e. on the transition from one flute of the workpiece to another in accordance with the prescribed flute pitch or lead and the division to be indexed respectively. For milling several helical flutes by using indexing method, producing the helical line and indexing were hitherto carried out by separate means, i.e. the rotary movement of the spindles for the helical-line rotation was imparted by a differential gearing, sprindles and toothed wheels or by means of a hydraulic or mechanical copying system, and the indexing movement of the spindles by an indexing apparatus. For separating the indexing movement from the helical line-rotation clutches are sometimes substituted for the differential gearing.

All the prior systems show the disadvantage that their structure is heavy, complicated, bulky and liable to torsion.

The invention aims at remedying these inconveniences by avoiding a differential gearing or clutches.

The machine tool according to the present invention is characterized in that, for carrying out the indexing movement of the spindle or spindles, it comprises means for producing a relative motion between the copying template and the copying device so that also the indexing movement of the spindle or spindles is produced by cooperation of the copying template with the copying device. This novel conception results in a considerable reduction in design length and a remarkable simplification compared to the prior constructions. Due to the cooperation of the copying template with the copying device also during the indexing procedure, driving the spindle or spindles can be produced by the copying device through the same drive means such as, for instance, toothed wheels, as they are used in prior machines for the rotation of the spindle during the copying operation. Therefore, a separate drive of the spindle or spindles by means of the bevel gears of a differential gearing is no longer necessary for the indexing operation.

In a particular performance of the machine tool according to the invention the means for producing the relative motion between the copying template and the copying device consists in that the copying template is provided on a cross-slide operatable by the indexing device, the said cross-slide being provided on the tool carriage in a manner to allow it to execute a transverse travel with regard to the tool carriage.

The drawing illustrates in a single schematic FIG. an example of performance of the machine tool according to the invention only in so far as is necessary to experts to understand the invention.

This example illustrates an automatic milling machine for the manufacture of tools such as, for instance, milling cutters, taps, reamers etc. with helically shaped flutes.

The headstock or workpiece clamping head 1 with three rotatable workpiece spindles 2 of different lengths is adjustably arranged in a well-known manner on the machine table 3. A hydraulic copying device 4, well known to those skilled in the art, with a copying tracer 5 is mounted on the headstock 1. Also the drive means between the copying device 4 and the spindles 2 is well known to experts and is, therefore, not shown and described. The copying template 6 has, in this embodiment, the shape of a ruler and is pivotally mounted on a cross-slide 8 with the aid of a bearing means 7. An adjusting scale or graduation 15 serves the adjustment of the inclination of the copying template 6 in accordance with the desired lead or pitch of the flutes to be machined on the workpiece. The cross-slide 8 is guided in a well-known guide not shown of the tool carriage or longitudinal slide 14 to allow the cross-slide 8 to reciprocate on the carriage 14 along the arrows A. The carriage 14 allowed to reciprocate along the arrows B in a manner known to experts carries the well-known tool head, not shown, carrying the milling cutters. The cross-slide 8 is driven by the indexing apparatus of known structure, of which only the indexing plate 9 rotatably mounted in a well-known manner on the carriage 14 is shown, the indexing plate 9 being held in place during copying operation by means of a pin 11 engaging one of the grooves 10 of the plate 9. The novel feature of this indexing device, constructed and operated in a manner known per se, resides in the fact that a pinion 12 is fixed to the shaft of the rotatable indexing plate 9, the pinion 12 engaging a toothed rack 13 of the cross-slide 8.

The embodiment shown and described works as follows:

In the condition shown in the drawing the cross-slide 8 is locked with regard to the carriage 14. The inclination of the copying template 6 is adjusted according to the prescribed lead or pitch of the helical flutes to be machined on the workpiece. The carriage 14 moves towards the right at the working speed. During this movement the copying template 6 pushes the copying tracer 5 back and the latter operates the hydraulic copying device 4 in a well-known manner not shown, the device 4 thereby rotating the spindles 2 in a manner known to experts at a prescribed speed. After completion of the milling or copying operation, the carriage 14 runs back in an accelerated manner and during or after this accelerated motion the indexing device is operated in a manner well-known to experts, i.e. the indexing plate 9, after withdrawal of the pin 11, is rotated by one division and afterwards locked again by engagement of the pin 11 in an adjacent groove 10. During rotation of the indexing plate 9 the pinion 12 engaging the toothed rack 13 has adjusted the cross-slide 8 in the direction of one of the arrows A relatively to the carriage 14 and transversely to the moving direction of the latter. From the above it follows that the indexing operation is obtained by producing a linear intermittent adjustment of the copying template 6 relatively to the copying device 4. The size of the intermittent motion of the template 6 determines the indexing rotation. According to the movement of the copying template 6 in either the one or the other direction A the template 6 has either allowed the copying tracer 5 to project more from the device 4 or has pushed the tracer 5 back, so that the spindles 2 have been rotated by one division whereupon the copying or milling procedure for machining another flute can be executed.

Therefore, contrary to prior machines, the copying template 6 does not only control the copying movement but also the indexing movement of the spindles 2. This double-action of the copying template 6 and, thereby, the avoidance of a differential gearing is possible because, due to the cross-slide 8, a relative motion of the template 6 with regard to the copying device 4 is produced during the indexing operation.

The same double-action may also be obtained by the following modifications according to the invention:

In another embodiment the copying template 6 can be directly disposed on the carriage 4. In this case the copying device 4 with the headstock 1 must be movable by the indexing device in a direction transverse to the axes of the spindles 2, this fact requiring a corresponding movement of the tool head (not shown).

In still another form of performance the copying template can be arranged on a fixed machine part or on a machine member which is only movable transversely to the machine table 3. In these cases, the helical motion is produced in that the copying device 4 and the headstock 1 execute the longitudinal movement and the copying template 6 only the relative transverse movement for producing the indexing motion.

In all embodiments according to the invention, the fact only is important that, for using the copying template to produce the indexing motion, a relative movement of the template 6 with regard to the copying device 4 or viceversa, or a relative movement by moving both parts 6 and 4 is possible.

If the copying template 6 is adjusted to be parallel to the motion-direction B, B, straight flutes can be machined. In this case, the template 6 only produces the indexing movement of the spindles.

In further embodiments of the invention the copying and indexing movements can be imparted to the nonillustrated tool or tools.

Instead of being a milling machine the machine tool according to the invention may serve other kinds of machining such as, for instance, turning, grinding or engraving.

The scope of protection is not limited to the embodiments shown and/or described, but the right is reserved to make such modifications and rearrangements that may come within the purview of the appended claims.

I claim:

1. A copying machine tool with an indexing apparatus, in which a copying template controls a copying device, characterized in that, for carrying out the indexing movement of the spindle or spindles, it comprises means for producing a relative motion between the copying template and the copying device so that also the indexing movement of the spindle or spindles is produced by cooperation of the copying template with the copying device.

2. A copying machine tool as claimed in claim 1, characterized in that the means for producing the relative indexing motion between the copying template and the copying device consists in that the copying template is provided on a cross-slide operatable by the indexing device, the said cross-slide being provided on the tool carriage to allow it to execute a transverse travel with regard to the tool carriage.

3. A copying machine tool as claimed in claim 2, characterized in that pinion operatable by the indexing plate of the indexing device is directly or indirectly in engagement with a toothed rack of the cross-slide.

4. A copying machine tool as claimed in claim 1, characterized in that the copying template is directly disposed on the tool carriage and in that the copying device is movable by means of the indexing device transversely to the axis of the spindle or spindles.

5. A copying machine tool as claimed in claim 1, characterized in that the copying template is arranged on a fixed machine part and in that the copying device and the spindle or spindles are movable longitudinally and transversely.

6. A copying machine tool as claimed in claim 1, characterized in that both the copying template and the copying device are movable for producing the relative indexing motion.